US010017079B2

(12) United States Patent
Pleskot

(10) Patent No.: US 10,017,079 B2
(45) Date of Patent: Jul. 10, 2018

(54) SEAT ATTACHMENT STRUCTURE IN A MOTOR VEHICLE

(71) Applicant: GM GLOBAL TECHNOLOGY OPERATIONS LLC, Detroit, MI (US)

(72) Inventor: Andrzej Pleskot, Seeheim-Jugenheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 108 days.

(21) Appl. No.: 15/015,506

(22) Filed: Feb. 4, 2016

(65) Prior Publication Data
US 2016/0229311 A1    Aug. 11, 2016

(30) Foreign Application Priority Data

Feb. 5, 2015    (DE) .................. 10 2015 001 326

(51) Int. Cl.
*B60N 2/015* (2006.01)
(52) U.S. Cl.
CPC .................. *B60N 2/015* (2013.01)
(58) Field of Classification Search
CPC ................. B60N 2/015; B60N 2/07
USPC ............................................. 296/63
See application file for complete search history.

(56) References Cited

U.S. PATENT DOCUMENTS

| 6,010,195 A * | 1/2000 | Masters ............... B60N 2/0232 297/284.11 |
| 8,807,508 B2 * | 8/2014 | Ferenc .................. B60N 2/682 248/429 |
| 9,242,586 B2 * | 1/2016 | Ferenc ..................... B60N 2/07 |
| 2010/0133407 A1 | 6/2010 | Fujieda et al. |
| 2013/0026328 A1 | 1/2013 | Ferenc et al. |

FOREIGN PATENT DOCUMENTS

| DE | 10224454 A1 * | 12/2003 | ............. B60N 2/015 |
| DE | 102007010904 A1 | 9/2008 | |
| DE | 102010055245 A1 * | 6/2012 | ........... B60N 2/0732 |
| DE | 102013205096 A1 * | 5/2014 | ........... B60N 2/0705 |
| EP | 0989017 A1 | 3/2000 | |
| WO | 9719727 A1 | 6/1997 | |
| WO | 2013141271 A1 | 9/2013 | |

OTHER PUBLICATIONS

Screen capture of "integral" definition from Bing search engine, 1 page. http://www.bing.com/search?q=define%3A+integral &srC=IE-SearchBox&Form=IESR02 (Year: 2017).*

(Continued)

*Primary Examiner* — Hilary L Gutman
(74) *Attorney, Agent, or Firm* — Lorenz & Kopf, LLP

(57) ABSTRACT

A motor vehicle includes a body, a drive motor, at least one seat with a retaining structure, a first connecting element, a second connecting element, and at least one fastening device with which the seat is attached to the body. The first connecting element is used to attach the fastening device to the retaining structure in a positive and/or non-positive connecting manner. The second connecting element is used to attach the fastening device to the body in a positive and/or non-positive manner.

18 Claims, 6 Drawing Sheets

(56) References Cited

OTHER PUBLICATIONS

German Patent Office, German Search Report for German Application No. 102015001326.2, dated Oct. 1, 2015.
Adjustable Seat Riser Brackets; Trique Manufacturing; 2016, AR,USA. http://www.triquemfg.com/Adjustable-Seat-Riser-Brackets-p/srb.htm.
Seat Floor Adapters; Turner Motorsport; 1993-2016, Amesbury, MA,USA. http://www.turnermotorsport.com/p-21542-seat-floor-adapters-e36-e46-e85-macht-schnell.aspx.
Wheels: Johnson Controls Has Simple 'Aha' Moment in Seat-Adjustment Design; Nelson Publushing, Inc.; Design Fax, Tech for OEM Design Engineers; Nov. 12, 2013, Volune 09 Issue 42. http://www.designfax.net/cms/dfx/opens/article-view-dfx.php?nid=4&bid=292&aid=2333&et=featurearticle&pn=04.
Lars Boelke, Smart seating concept from Johnson Controls offers 3-in-1 seat tracks for small and compact vehicles, Mondial 2014 Media Information, Oct. 2014, Johnson Controls at Mondial, Paris, France. http://www.johnsoncontrols-mondial.com/en/seating/details/smart-seating-concept-from-johnson-controls-offers-3-in-1-seat-tracks-for-small-and-compact-vehicles-55.html.
Assembly Instructions; Scat Enterprises, Inc.; Redondo Beach, CA,USA. Retrieved on Feb. 4, 2016. Retrieved from Internet <URL:http://scatenterprises.com/docs/Procar-Seating-Assembly-Instructions.pdf>.

\* cited by examiner

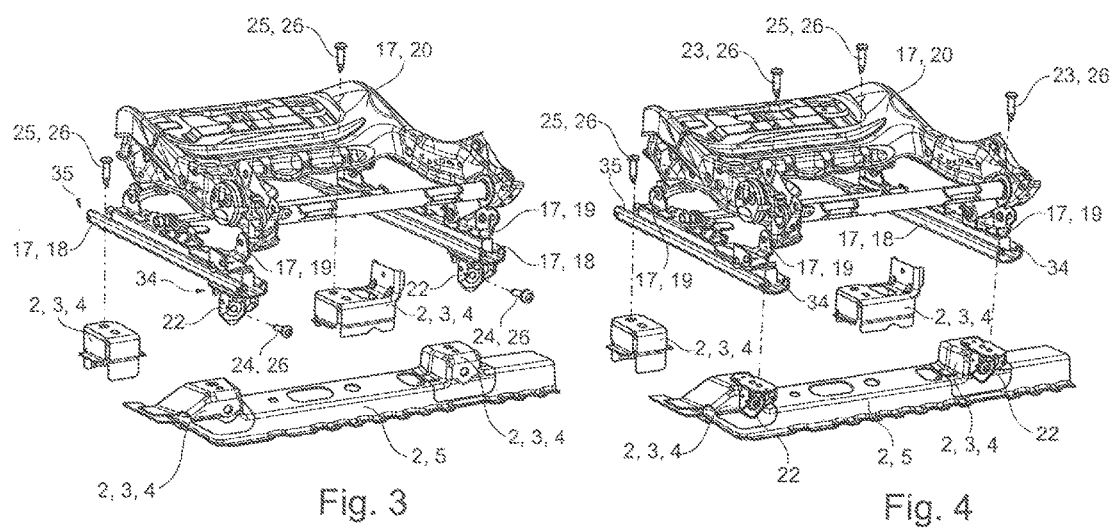

SEAT ATTACHMENT STRUCTURE IN A MOTOR VEHICLE

CROSS-REFERENCE TO RELATED APPLICATION

This application claims priority to German Patent Application No. 102015001326.2, filed Feb. 5, 2015, which is incorporated herein by reference in its entirety.

TECHNICAL FIELD

The present disclosure pertains to a motor vehicle, and more particularly to a seat attachment structure in a motor vehicle.

BACKGROUND

Motor vehicles exhibit a passenger compartment, and seats are arranged inside of the passenger compartment. Front seats here exhibit a seat part and back part, which is mounted so that it can pivot around a swivel axis relative to the seat part. Rear seats are situated behind the front seats inside of the passenger compartment of the motor vehicle. The rear seats are here generally included as three seats combined into a rear seat bench. The front seats include a rail as the retaining structure, and the rail is rigidly or fixedly attached to the body with a fastening device. Support feet can move inside of the rails, thereby making it possible to move the front seats in a longitudinal or X direction of the motor vehicle. A foot well is created at the rear seats of the motor vehicle for accommodating the feet of the persons seated in the rear seat bench or rear seats. The foot well is formed or bordered between the rear seat and back part of the front seat.

Motor vehicles as hybrid or electric vehicles exhibit a battery for supplying power to the electric motor for the motor vehicle. Among other things, the batteries are also fastened underneath the foot well area. A rearward end area of the rails of the front seats is fixed to a cross member of the body with a fastening device. Because the batteries are arranged underneath the foot well for the rear seats, the cross member must structurally be moved more toward the front of the vehicle. As a result, it no longer makes sense to attach the rails to the cross member in the necessary position. Attaching the rail in another position, for example one lying more toward the front, negatively affects the foot well at the front seat, and also results in an inexpedient attachment or positioning of the front seat as a whole inside of the motor vehicle.

US 2013/0026328 A1 discloses a fastening device for a seat. The fastening device makes it possible to fix the rail for the seat at a large distance from the body. The fastening device is secured to the rail by a welded joint. The fastening device is L-shaped, and a lower section of the L-shaped fastening device is used for attachment to the body.

SUMMARY

In accordance with the present disclosure, a motor vehicle is provided in which the retaining, structure such as a rail of a seat is also attached to the necessary position in a motor vehicle as an electric or hybrid vehicle. In particular, a motor vehicle in accordance with the present invention includes a body, a drive motor, such as an electric motor and/or a combustion engine, a seat with a retaining structure, at least one A- or first connecting element, at least one B- or second or connecting element, and at least one fastening device with which the seat is attached to the body. The fastening device is attached to the retaining structure with the first connecting element and attached to the body with the second connecting element. The first connecting element is designed as either a positive or non-positive first connecting element, and the second connecting element is designed as either a positive or non-positive second connecting element.

Given the design of both the first connecting element and the second connecting element, a substance-to-substance bond, in particular a welded joint, is advantageously not required between the fastening device and the body on the one hand, and between the fastening device and the retaining structure. This makes it especially easy to mount the fastening device and also bring it into a corresponding geometrical alignment, so that, even if a battery for the electric motor is arranged underneath a foot well for the rear seats, the retaining structure is aligned in the necessary position inside of the motor vehicle. An A- or first connecting element is a connecting element for attaching the fastening device to the retaining structure. A B- or second connecting element is a connecting element for attaching the fastening device to the body.

In particular, the first connecting element may be designed exclusively as a positive and/or non-positive first connecting element forming a detachable connecting element. The second connecting element may be designed exclusively as a positive and/or non-positive second connecting element forming a detachable second connecting element. Because the first and/or second connecting element is detachable, it can thus also be removed from the body or retaining structure again after assembly. In another embodiment, the first connecting element may be configured a screw, threaded fastener or rivet, and not a welded joint. The second connecting element may be configured as a screw or rivet, and not a welded joint.

In an additional embodiment, the seat includes a front seat, and/or a back part which can be pivoted around a preferably horizontal swivel axis, and the fastening device is arranged between the retaining structure and the body. The distance between a lower end of the retaining structure, in the area of which the fastening device is attached, and an upper end of the body, in particular an upper end of a projection, in the area of which the fastening device is attached, is less than 5 cm, 3 cm, 2 cm or 1 cm. The motor vehicle includes a battery for storing electrical power for the electric motor. It is advisable that the battery be arranged behind a cross member of the body, and the fastening device be indirectly or directly attached to this cross member. The fastening device with the second connecting element is preferably attached to a projection, in particular a hump and/or a base and/or a cross member, of the body. The hump and/or base is generally secured to the cross member, i.e., an upper end of the hump or base is aligned vertically more toward the top than an upper end of the cross member.

In a variant, the projection exhibits a rearward end in the longitudinal or X-direction of the motor vehicle, and the fastening device exhibits an upper end, in particular an upper supporting surface, for the retaining structure in the vertical or Z-direction of the motor vehicle, and the upper end of the fastening device in the X-direction is at least partially formed behind the rearward end of the projection. Because the battery is arranged inside of the motor vehicle, the cross member must from a structural standpoint lie more toward the front inside of the motor vehicle or passenger compartment. Because the upper end of the fastening device is positioned behind the rearward end of the projection, the rail can thus be placed on and secured to this upper end of the fastening device, i.e., the fastening device serves to downwardly bridge or lengthen the base. As a result, the rail inside of the passenger compartment can be easily secured in the necessary position for the front seat.

It is advisable that the projection exhibit rearward end in the X-direction of the motor vehicle and that the fastening device in the Z-direction of the motor vehicle exhibit an upper end, in particular an upper supporting surface, for the retaining structure, and that at least 20%, 30%, 40% or 50% of the surface of the upper end of the fastening device be formed behind the rearward end of the projection in the X-direction.

In another embodiment, the projection exhibits a rearward end in the X-direction of the motor vehicle, and the fastening device in the Z-direction of the motor vehicle exhibits an upper end, in particular an upper supporting surface, for the retaining structure, and the retaining structure is arranged behind the rearward end of the projection in the X-direction, and/or the projection exhibits a rearward end in the X-direction of the motor vehicle, and the fastening device in the Z-direction of the motor vehicle exhibits an upper end, in particular an upper supporting surface, for the retaining structure, and the retaining structure lies on the top end and/or the retaining structure is arranged above the upper end of the fastening device in the Z-direction. In particular, the projection exhibits a rearward end in the X-direction of the motor vehicle, and the fastening device in the Z-direction of the motor vehicle exhibits an upper end, in particular an upper supporting surface, for the retaining structure, and the second connecting element is formed behind the rearward end of the projection in the X-direction.

In another embodiment, the retaining structure is attached to the body in a front end area by a preferably detachable C- or third connecting element, in particular a cage nut, and/or a screw. It is advisable that the first connecting element and/or second connecting element and/or third connecting element consist of several parts, for example be designed as a screw and/or rivet and/or a nut and/or a cage nut with nut and cage. The respective first, second and/or third connecting element can also include several screws and/or rivets and/or nuts and/or cage nuts with respective nut and cage.

In an additional variant, the third connecting element and/or retaining structure and/or body are designed so that a tolerance compensation, preferably of at least 1 mm, 2 mm, 4 mm or 7 mm, in the X-direction and/or in the lateral or Y-direction and/or in the Z-direction can be effected between the retaining structure and body.

In another variant, the fastening device and/or the retaining structure and/or the body are designed so that a tolerance compensation, preferably of at least 1 mm, 2 mm, 4 mm or 7 mm, in the X-direction and/or Y-direction and/or Z-direction can be effected between the retaining structure and body. The tolerance compensation makes it easy to balance out production inaccuracies, thereby enabling a smooth assembly of the fastening device. In addition, this makes it possible to balance out the structurally induced deviations of various motor vehicles or various models of motor vehicles. For example, different rails can be secured in the necessary position in an identical motor vehicle or vice versa.

In another embodiment, a recess, in particular an oblong hole, is formed on the fastening device and/or on the retaining structure and/or on the body and/or on the third connecting element, and the diameter of the recess is greater than the diameter of a connecting element, and the connecting element is arranged inside of the recess. Because of the varying diameter of the oblong hole and the connecting element, the connecting element can be moved inside of the oblong hole for purposes of tolerance compensation.

In an additional variant, the retaining structure is designed like at least one rail, preferably two rails.

It is advisable that the retaining structure be attached to the body at a rearward end area with the fastening device.

In a further embodiment, the fastening device includes at least one A- or first positioning lug arranged inside of an opening, in particular an oblong hole, of the retaining structure, and/or the fastening device includes a B- or second positioning lug arranged inside of an opening, in particular an oblong hole, of the body, in particular the projection.

In an expedient embodiment, the fastening device exhibits at least one, preferably two, local supporting elevations, so that the fastening device lies on the body on the supporting elevation, in particular exclusively, in the Z- or X-direction, and the supporting elevation preferably forms a stop in the Z- or X-direction during assembly. The stop is an end in the Z-direction as a lower end, or an end in the X-direction as an end in the longitudinal direction.

In an additional embodiment, the fastening device is at least partially, in particular completely, made out of metal, in particular steel and/or aluminum. It is advisable that the parts of the fastening device be made at least partially, in particular completely, out of metal, in particular steel and/or aluminum, and that the parts of the fastening device preferably include a first plate part and/or a U-shaped part and/or a nut for a first connecting element and/or a second connecting element.

BRIEF DESCRIPTION OF THE DRAWINGS

The present disclosure will hereinafter be described in conjunction with the following drawing figures, wherein like numerals denote like elements.

FIG. 3 is a first expanded view of a retaining structure of the front seat, two fastening devices and a portion of the body;

FIG. 4 is a second expanded view of a retaining structure of the front seat, two fastening devices and a portion of the body;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
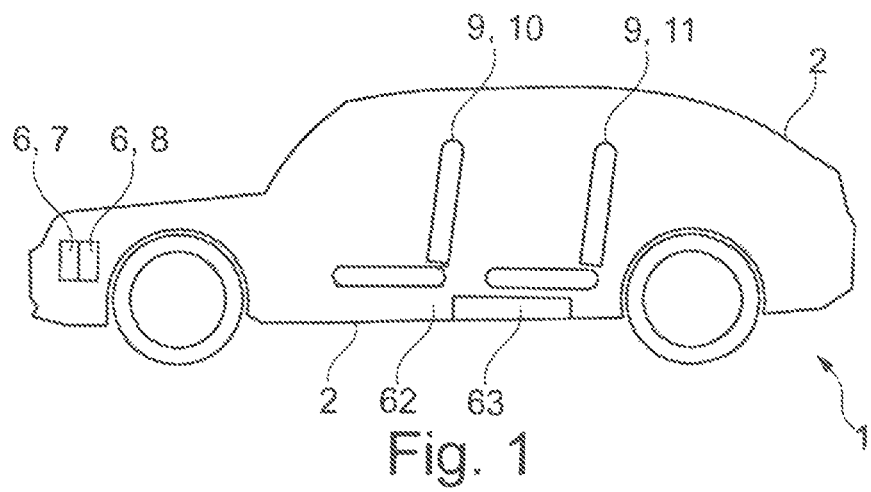
FIG. 1 is a schematic side view of a motor vehicle.

A motor vehicle 1 shown on FIG. 1 as a hybrid or electric motor vehicle 1 includes a body 2 made out of metal, in particular steel. The motor vehicle 1 is moved by means of a drive motor 6, for example an electric motor 7, and preferably an internal combustion engine 8. An electric motor vehicle 1 includes only the electric motor 7 as the drive motor 6, while a hybrid motor vehicle 1 exhibits both the electric motor 7 and an internal combustion engine 8. The body 2 made out of steel borders a passenger compartment, and two front seats 10 as seats 9 along with three rear seats 11 as seats 9 are arranged inside of the passenger compartment. The three rear seats 11 are here combined into a seat bench, and a foot well area 62 is provided on the rear seats 11 for the feet of persons on the rear seats 11. A battery 63 for storing electrical power for the electric motor 7 is secured underneath the foot well area 62.

Figure 2:
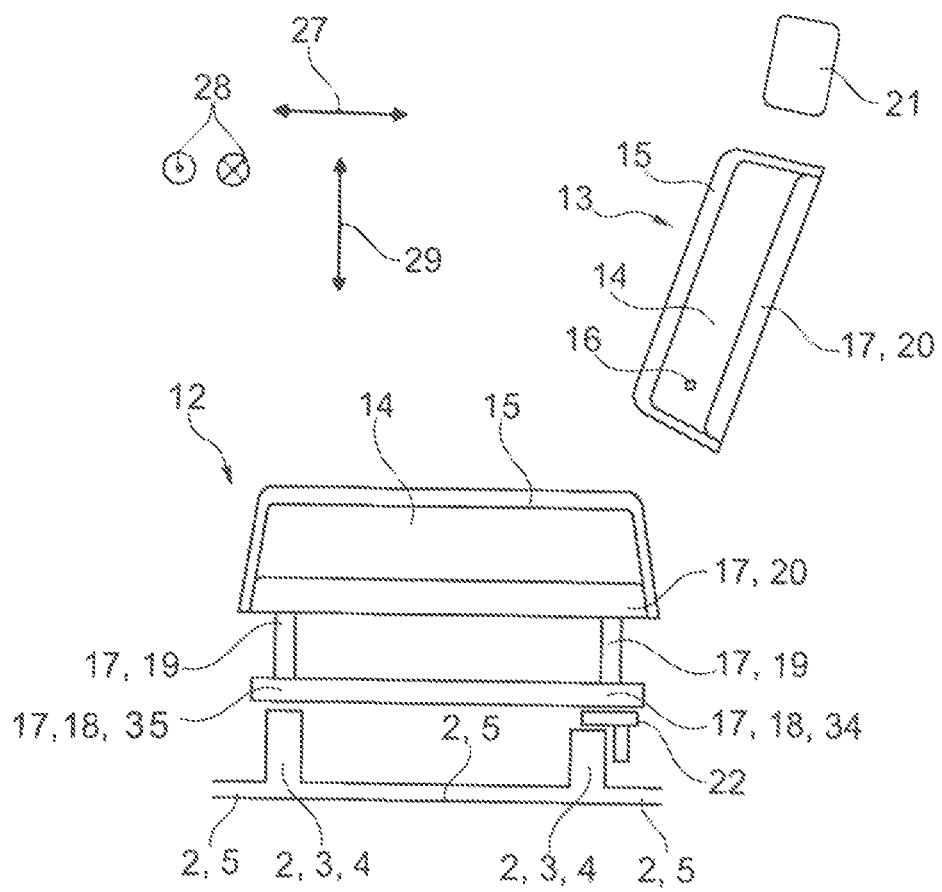
FIG. 2 is a longitudinal schematic section of a front seat of the motor vehicle.

FIG. 2 presents a longitudinal section through the front seat 10. The front seat 10 includes a seat part 12 and a back part 13. The seat part 12 and the back part 13 each exhibit a frame 20 as a retaining structure 17, to which are secured a cushion 14 and a seat cover 15. A headrest 21 is further secured to the back part 13, and the back part 13 can be pivoted around a swivel axis 16. The seat part 12 is attached to a rail 18 by means of support feet 19. The rail 18 is attached to the body 2 in a rearward end area 34 with a fastening device 22. The support feet 19 are movably mounted on the rail 18, and can here be used to horizontally move the entire front seat 10 in the longitudinal direction or X-direction of the motor vehicle 1. The frame 20 of the back part 13 is joined with the frame 20 of the seat part 9 by connecting parts (not depicted) so that both the seat part 12 and back part 13 thus together also perform the horizontal movement when horizontally moving the front seat 7. The retaining structure 17 includes the frame 20, support feet 19 and rails 18.

Figure 5:
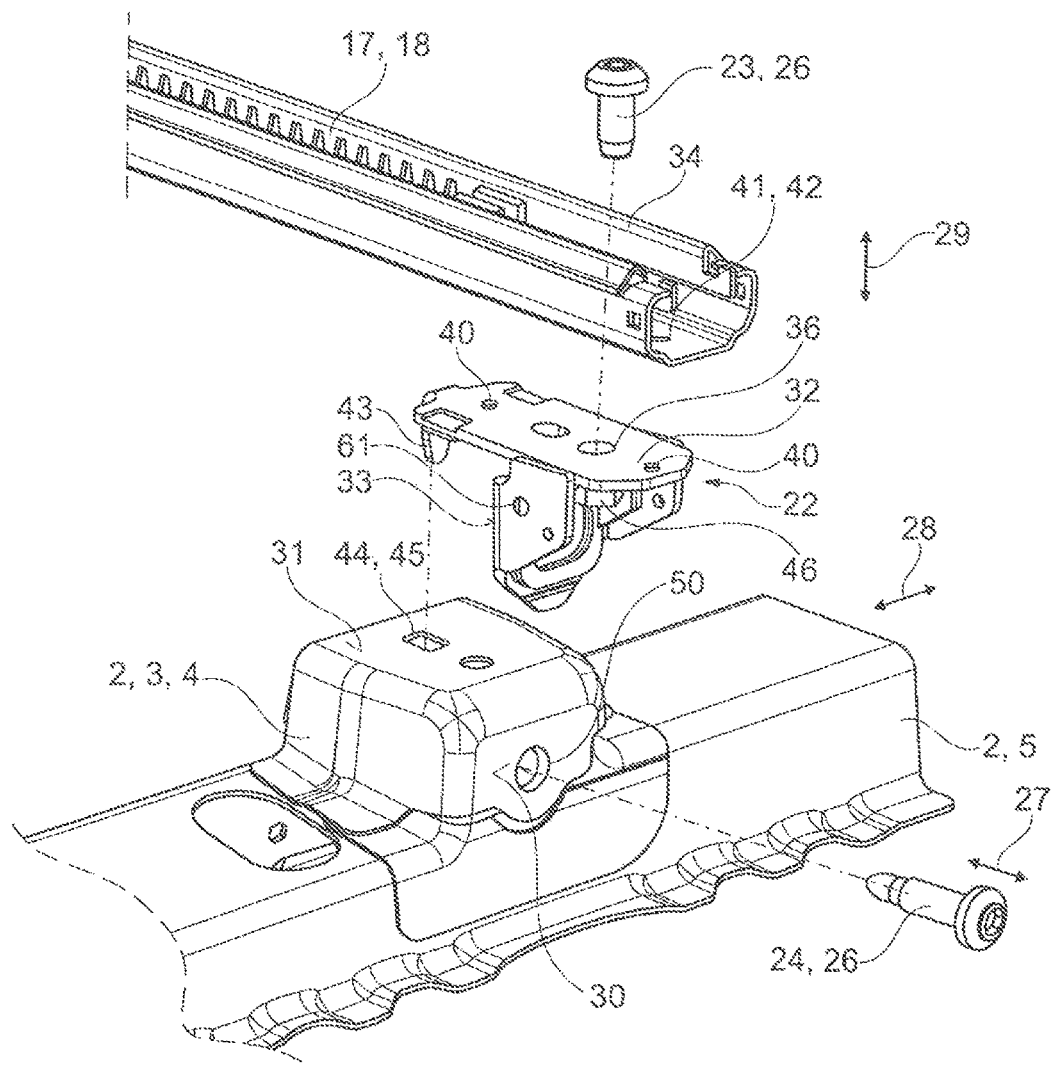
FIG. 5 is a first expanded view of the fastening device, the portion of the body and a rail as the retaining structure.

The front seat 10 is secured to the body 2 by two rails 18. The rails 18 here each include a front end area 35 and the rearward end area 34. At the front end area 35, the rails 18 are secured to the body 2 with a screw 26 as a C- or third connecting element 25. The third connecting element 25 is here attached to a projection 3, i.e., a hump 4 or a base 4. The screw 26 as the third connecting element 25 is screwed to the base 4 with a cage nut (not depicted), thereby enabling a tolerance compensation at the front end area 35 of the rail 18 in relation to the base 4 in the X-direction 27 in the longitudinal direction of the motor vehicle 1 and in a Y-direction 28 as the transverse direction of the motor vehicle 1. At the rearward end area 34, the rails 18 are indirectly attached to the base 4 with the fastening device 22. As a consequence, there is no direct contact between the base 4 and rail 18 at the rearward end area 34, since the fastening device 22 is arranged between the rail 18 and base 4. The base 4 also forms the body 2 like across member 5, or consists of the latter. The base 4 is here formed at the top on a cross member 5 of the body 2 (FIG. 3 to 5).

Figure 8:
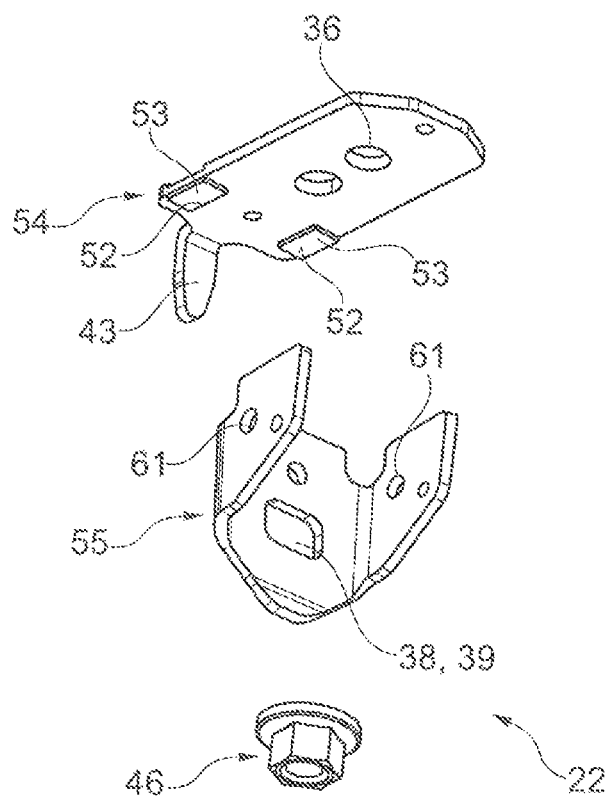
FIG. 8 is an expanded view of the parts of the fastening device.
Figure 9:
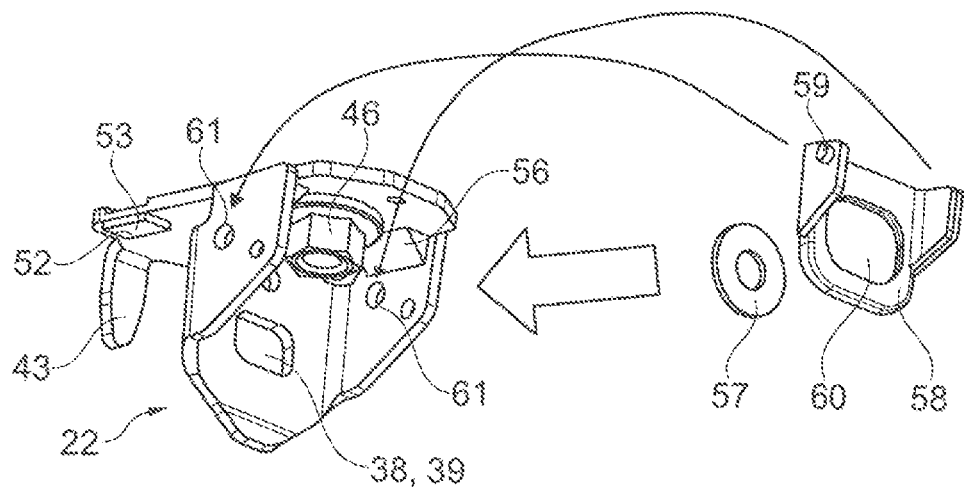
FIG. 9 is a perspective view of the fastening device and a retaining, clip.
Figure 10:
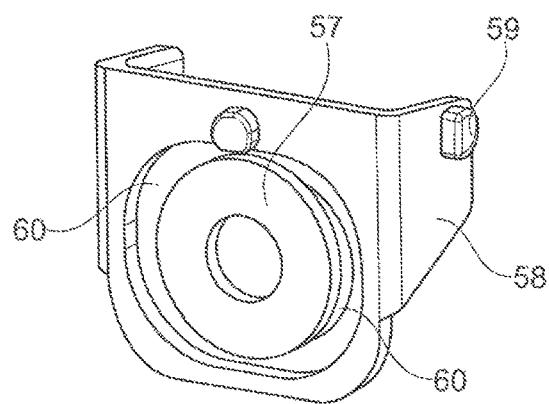
FIG. 10 is a perspective view of the retaining clip and a washer.
Figure 11:
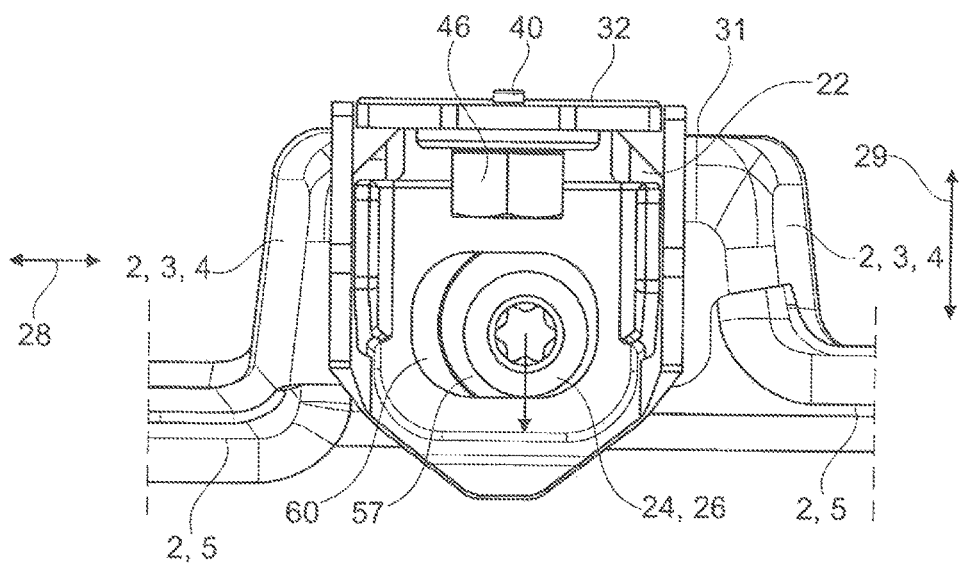
FIG. 11 is a rear view of the fastening device screwed to a base of the body.

The fastening device 22 includes a first essentially rectangular first plate part 54 and a U-shaped part 55. The first plate part 54 and the U-shaped part 55 are bonded together substance-to-substance by means of a welded joint 56 (FIGS. 8 and 9). A nut 46 is fixed on the lower side of the first plate part 54. The opening of the nut 46 with a female thread of the nut 46 (not depicted) aligns with a recess 36 as the borehole for an A- or first connecting element 23 as a screw 26. The hump 4 or base 4 formed on the top side of the cross member 5 exhibits an upper end 31 and a back end 30. A B- or second connecting element 24 as a screw 26 is used to attach the fastening device 22 to the body 2, i.e., to the base 4. The first connecting element 23 is used to attach the fastening device 22 to the rail 18.

Figure 6:
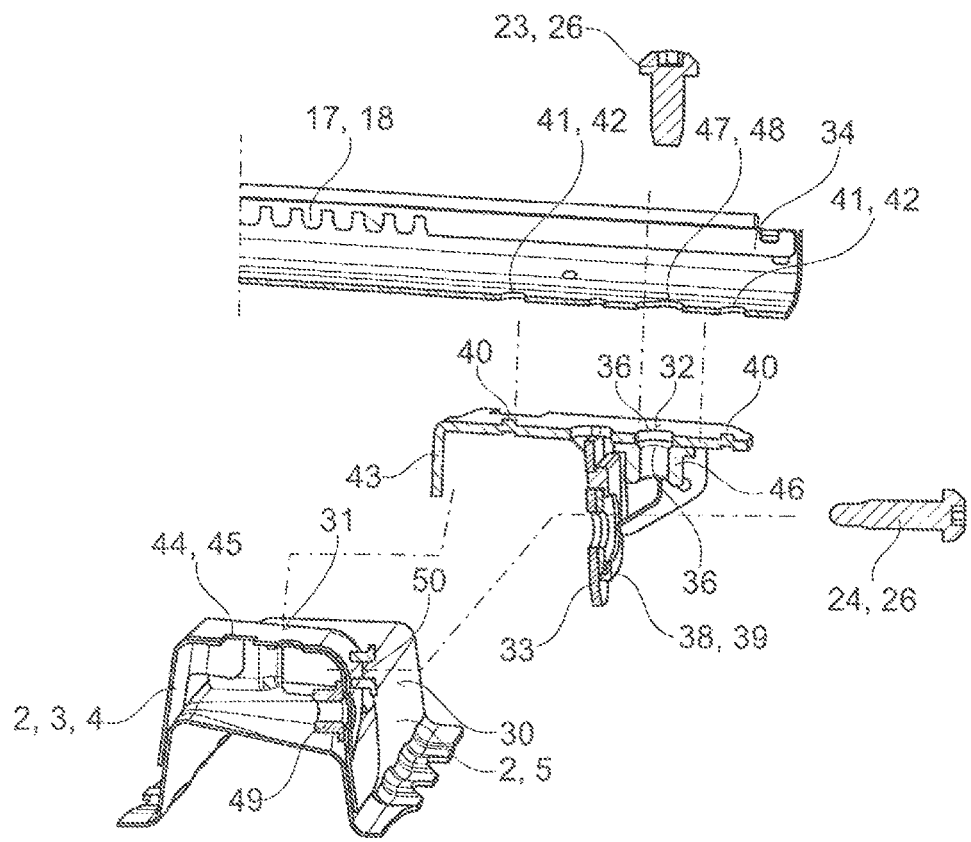
FIG. 6 is a second expanded view of the fastening device, the portion of the body and a rail as the retaining structure.
Figure 7:
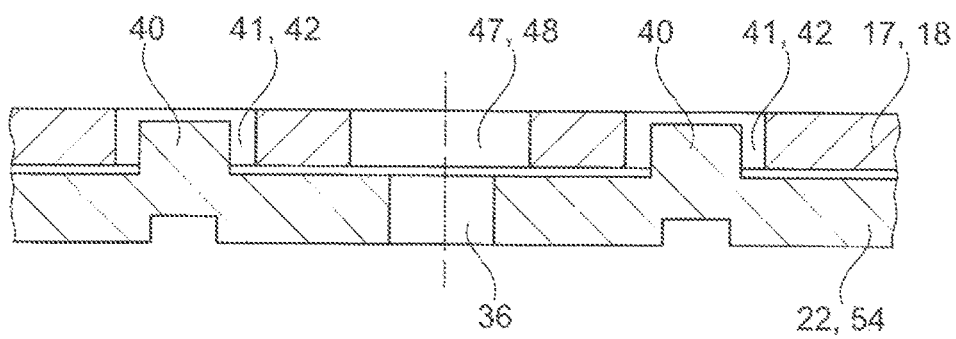
FIG. 7 is a partial longitudinal section of the rail and fastening device.

During assembly, the fastening device 22 can either first be attached to the rail 18 (FIG. 3) and then to the base 4, or the fastening device 22 can first be attached to the base 4 (FIG. 4), after which the rail 18 is secured to the fastening device 22. The rail 18 exhibits an oblong hole 47 as a borehole 48 for passing through and accommodating the first connecting element 23. Also provided on the rail 18 are openings 41 as oblong holes 42 for accommodating first positioning lugs 40. The A- or first positioning lugs 40 are formed at an upper end 32 as a supporting surface 32 in the Z-direction 29 or vertical direction 29 for supporting the rail 18 (FIGS. 5 and 6). During assembly of the fastening device 22, the first positioning lugs 40 are first introduced into the oblong holes 42 on the rail 18 (FIG. 7), after which the screw 26 as the first connecting element 23 is first passed through the oblong hole 47 on the rail 18, and then through the recess 36 on the fastening device 22, after which the first connecting element 23 is screwed to the nut, so that a tensile force acts in the first connecting element 23. As a result, the fastening device 22 is positively and non-positively fixedly joined with the rail 18. In order to attach the fastening device 22 to the base, a B- or second positioning lug 43 on the fastening device 22 is first introduced into an opening 44 as an oblong hole 45 in the base 4 until two supporting elevations 53 lie on the upper end 31 of the base 4. The supporting elevations 53 thereby form a lower end 52 as a supporting surface 52 or stop 52 in the Z-direction 29 for the fastening device 22.

A retaining clip 58 made out of plastic exhibits a respective detent 59 on two legs. These detents 59 secure the retaining clip 58 to the fastening device 22, since the detents 59 are arranged inside of latching boreholes 61 (FIG. 9). The retaining clip 58 is only used to arrange a washer 57 made out of metal on the fastening device 22. As a consequence, the retaining clip 58 serves only as an assembly aid, so that the washer 57 is not to be slipped over the second connecting element 24 during assembly; rather, the washer 57 is already placed on the fastening device 22 at the oblong hole 39. The washer 57 is here positioned on the U-shaped part 55 of the fastening device 22 opposite a front end 33 so as to lie on the U-shaped part 55. The opening of the washer 57 here aligns with an oblong hole 39 as a recess 38 on the fastening device 22 (FIG. 9), so that the washer 57 thereby becomes placed on the side of the fastening device 22 visible on FIG. 9 in the area of the oblong hole 39. After the second positioning lug 43 has been introduced into the oblong hole 45 on the base 4 and the two supporting elevations 53 have come to lie on the upper end 31 of the base 4, the second connecting element 24 as the screw 26 is first passed through an opening 60 as an oblong hole 60 on the retaining clip 58, then passed through the opening in the washer 57, and subsequently passed through the oblong hole 39 on the fastening device 22, until the second connecting element 24 as the screw 26 can be screwed with a nut 49, so that the front end 33 of the fastening device 22 lies on the back end 30 of the base 4, exposed to a compressive force owing to the tensile force acting in the second connecting element 24. The nut 49 (FIG. 6) is internally fixed inside of the base 4, for example by means of a welded joint.

The oblong holes 42 for the first positioning lugs 40 and the oblong hole 47 for the first connecting element 23 exhibit a significantly greater expansion in the X-direction 27 than in the Y-direction 28. After the first connecting element 23 has initially been screwed into the nut 46, the rail 18 can thus continue to be moved in the X-direction 27 for purposes of tolerance compensation due to the expansion of the oblong holes 42, 47. This enables a tolerance compensation in the X-direction 27. The oblong hole 45 also exhibits a significantly greater expansion in the X-direction 27 than the second positioning lug 43, thereby also enabling a tolerance compensation in the X-direction 27 of the fastening device 22 relative to the base 4. The oblong hole 39 on the fastening device 22 exhibits a greater expansion in both the Y-direction 28 and Z-direction 29 than the diameter of the second connecting element 24. However, a significantly greater tolerance compensation on the oblong hole 39 is possible in the Y-direction 28 than in the Z-direction 29. The opening 44 also enables a tolerance compensation in the Y-direction 28. Tolerance compensation in the Z-direction 27 by means of the oblong hole 39 is essentially necessary, because the nut 49 can only be secured to the base 4 with production inaccuracies. In addition to balance out production inaccuracies, tolerance compensation in the X- and Y-directions 27, 28 with the fastening device 22 generally also serves to allow use of the fastening device 22 to additionally secure different rails 18 or retaining structures 17 to identical bases 4 or bodies 2, or identical rails 18 or retaining structures 17 to different bases 4 or bodies 2 or different rails 18 or retaining structures 17 to different bases 4 or bodies 2. As a result, the fastening device 22 can be used in different models of motor vehicles 1.

Viewed as a whole, significant advantages are associated with the motor vehicle 1 according to the present disclosure. The two fastening devices 22 can be used to indirectly secure the two rails 18 to the base 4 of the body 2 at the rearward end area 34. The fastening device 22, and hence also the upper end 32 as the supporting surface 32 for the rail 18, are here partially secured behind the back end 30 of the base 4 viewed in the X-direction 27. In this way, the fastening device 22 acts as kind of extension or cantilever arm relative to the base 4, so that the rail 18 becomes situated in the necessary position inside of the passenger compartment of the motor vehicle 1 as a result. The manner in which the battery 63 is arranged in the area or underneath the foot well 62 for the rear seats 11 makes it structurally necessary to move the cross member 5 more toward the front. This structural necessity for the design of the cross member 5 arising from the battery 63 can be offset by the fastening device 22, since the rails 18 can thereby continue to be attached in the required position inside of the motor vehicle 1. The back end of the rail 18 here exhibits a distance in excess of 0.5 cm, 1 cm, 2 cm, 3 cm, 4 cm relative to the back end 30 of the base 4 in the X-direction. This ensures the necessary position of the rail 18 inside of the passenger compartment of the motor vehicle 1.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
   a body with a projection, the projection having a rearward end in a longitudinal direction of the body;
   a seat with a retaining structure, the retaining structure including a rail, the rail configured to support movement of the seat relative to the body; and
   at least one fastening device attaching the rail to the body, the at least one fastening device including a first connecting element that is detachably secured to the rail, the at least one fastening device including a second connecting element that is detachably secured to the projection of the body, and wherein at least one of the first and second connecting elements is configured as a non-material joined element;
   the at least one fastening device comprising an upper supporting surface for the retaining structure in a vertical direction of the body, the upper supporting surface being at least partially formed behind the rearward end of the projection in the longitudinal direction.

2. The motor vehicle according to claim 1, wherein at least one of the first connecting element and the second connecting element is configured as a threaded fastener.

3. The motor vehicle according to claim 1, wherein a distance between a lower end of the retaining structure in an area of which the fastening device is attached, and an upper end of the body in an area of which the fastening device is attached, is less than 5 cm.

4. The motor vehicle according to claim 3, wherein the distance is less than 1 cm.

5. The motor vehicle according to claim 1, wherein at least 20% of the upper supporting surface is formed behind the rearward end of the projection in the longitudinal direction.

6. The motor vehicle according to claim 5, wherein at least 50% of the upper supporting surface is formed behind the rearward end of the projection in the longitudinal direction.

7. The motor vehicle according to claim 1, wherein the retaining structure is arranged behind the rearward end of the projection in the longitudinal direction.

8. The motor vehicle according to claim 1, wherein the second connecting element is formed behind the rearward end of the projection in the longitudinal direction.

9. The motor vehicle according to claim 1, wherein the retaining structure further comprising a third connecting element detachable secured to the body in a front end area.

10. The motor vehicle according to claim 9, wherein at least one of the third connecting element, the retaining structure and the body are configured such that a tolerance compensation of at least 1 mm in at least one of the longitudinal direction, a lateral direction, and the vertical direction is effected between the retaining structure and body.

11. The motor vehicle according to claim 9, wherein at least one of the fastening device, the retaining structure and the body are configured such that a tolerance compensation of at least 1 mm in at least one of the longitudinal direction, a lateral direction, and the vertical direction is effected between the retaining structure and body.

12. The motor vehicle according to claim 1, wherein a recess is formed in at least one of the fastening device, and the retaining structure and is configured to receive a portion of one of the first or second connecting elements, wherein a diameter of the recess is greater than a diameter of the portion of the one of the first or second connecting elements arranged inside of the recess.

13. The motor vehicle according to claim 1, wherein the retaining structure is attached to the body at a rearward end area with the at least one fastening device.

14. A motor vehicle comprising:
- a body with a projection, the projection having a rearward end in a longitudinal direction of the body;
- a seat with a retaining structure; and
- at least one fastening device attaching the seat to the body, the at least one fastening device including a first connecting element used to detachably secure the at least one fastening device to the retaining structure and a second connecting element used to detachably secure the at least one fastening device to the projection of the body, at least one of the first and second connecting elements being configured as a non-material joined element;
- the at least one fastening device comprising an upper supporting surface for the retaining structure in a vertical direction of the body, the upper supporting surface being at least partially formed behind the rearward end of the projection in the longitudinal direction.

15. The motor vehicle according to claim 14, wherein at least 20% of the upper supporting surface is formed behind the rearward end of the projection in the longitudinal direction.

16. The motor vehicle according to claim 15, wherein at least 50% of the upper supporting surface is formed behind the rearward end of the projection in the longitudinal direction.

17. The motor vehicle according to claim 14, wherein the retaining structure is arranged behind the rearward end of the projection in the longitudinal direction.

18. The motor vehicle according to claim 14, wherein the second connecting element is formed behind the rearward end of the projection in the longitudinal direction.

\* \* \* \* \*